United States Patent [19]

Arroyo, Jr.

[11] Patent Number: 5,062,210
[45] Date of Patent: Nov. 5, 1991

[54] CACTUS THORN REMOVING TOOL

[76] Inventor: Jose C. Arroyo, Jr., 229 Casalon Dr. #7, O'Fallon, Mo. 63366

[21] Appl. No.: 605,103

[22] Filed: Oct. 26, 1990

[51] Int. Cl.⁵ .............................................. B26B 3/00
[52] U.S. Cl. ......................................... 30/317; 30/331; 30/339; 47/1.01
[58] Field of Search ....................... 30/47, 85, 87, 121, 30/169, 317, 330, 331, 332, 339; 15/236.1; 47/1.01

[56] References Cited
U.S. PATENT DOCUMENTS
967,831 8/1910 Pratt ........................................ 30/49

Primary Examiner—Douglas D. Watts
Attorney, Agent, or Firm—Donald J. Breh

[57] ABSTRACT

A cutter for removing thorns from cactus is disclosed including a fork shaped member having a pair of prongs pivotably connected together at one end and having tabs at free ends received in traverse slots in a conventional wafer type razor blade. A tie member holds the prongs in a spacing to flex the razor blade into a concavo convex shape with the convex surface facing outwardly from the free ends of the cutting edge of the blade perpendicular to the plane of the prongs.

3 Claims, 1 Drawing Sheet

U.S. Patent
Nov. 5, 1991
5,062,210
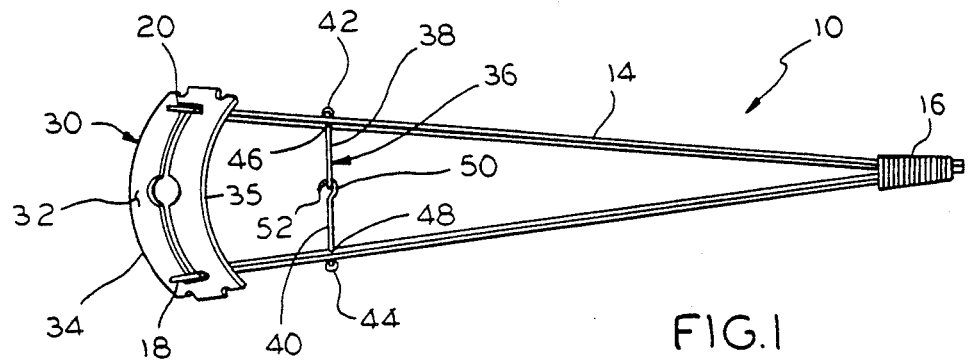
FIG.1
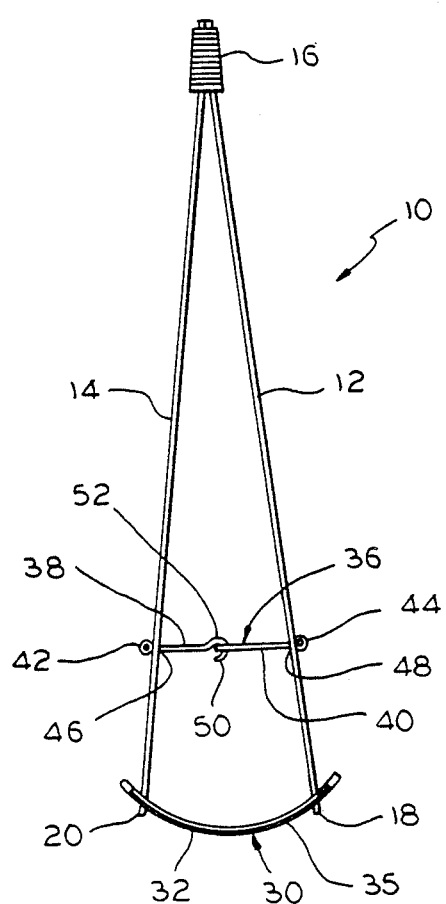
FIG.2
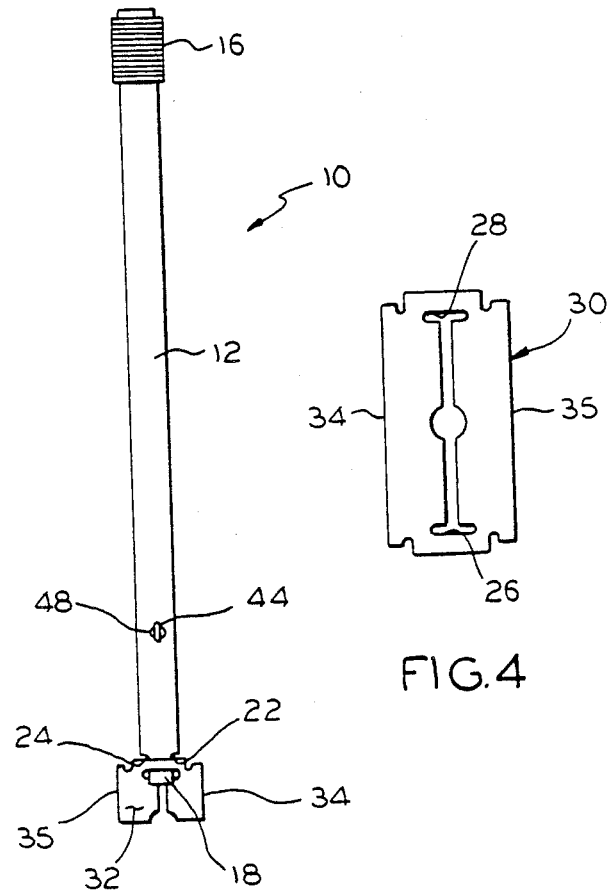
FIG.3
FIG.4

CACTUS THORN REMOVING TOOL

BACKGROUND OF THE INVENTION

This invention relates to cutters. More particularly, the invention relates to a cutter for removing thorns from cactus.

Cactus are known to be a food source especially in certain areas where they are plentiful. In order to prepare cactus, however, it is obvious that their thorns must be removed. Although razors have been devised for shaving irregular surfaces such as, for example, the human body, such as those described in U.S. Pat. Nos. 4,720,917; 4,459,744; and 2,421,205 no cutter adapted to effectively remove thorns from those cactus most often used as a food source without unduly gouging or mutilating the cactus is known to exist and it is the object of this invention to provide for such a cutter.

SUMMARY OF THE INVENTION

According to the invention, there is provided a fork shaped member including a pair of prongs pivotably attached at one end and having opposite ends adapted to removably attach a common wafer-type razor blade to the prongs and means for flexing and holding the razor blade in a concavo-convex configuration with the cutting edge of the blade disposed perpendicular to a plane of the prongs.

According to a preferred embodiment, the free ends of each prong is provided with a tab like projection sized to be received in the pair of transverse slots provided in a conventional razor blade.

According to another feature, the means for holding the blade in a flexed condition includes a tie member connected between the prongs of the fork shaped member.

BRIEF DESCRIPTION OF THE DRAWINGS

The invention will be better understood after reading the following Detailed Description of the Preferred Embodiment in conjunction with the drawings in which:

FIG. 1 is a perspective view of a preferred embodiment of the invention;

FIG. 2 is a front view of the device of FIG. 1 showing details of construction;

FIG. 3 is a side view of the device of FIG. 1 showing further details of construction; and FIG. 4 is a plan view of a common double edge wafer type razor blade of the type having spaced apart transverse slots and with which the present invention is adapted to be used.

DETAILED DESCRIPTION OF THE PREFERRED EMBODIMENT

Shown in FIG. 1 is a cutter 10 especially adapted for removing thorns from cactus. The cutter includes a fork like handle composed, in the embodiment shown, of a pair of diverging prongs 12, 14 which can be metal, wood or plastic as desired and could be manufactured in a one piece construction if desired. The prongs 12, 14 are connected together at one end for pivotable movement, for example with twine 16 as shown in FIG. 1, and diverge outwardly from the junction a distance on the order of preferably about 4 inches. The free end of each prong is provided with a rectangular projection 18, 20 each forming a pair of shoulders, one pair 22, 24 being shown in FIG. 3. Each tab or projection 18, 20 is sized to be received in one of two transverse rectangular slots 26, 28 that are provided in a conventional double edge wafer type razor blade 30 shown in FIG. 4. When the projections or tabs 18, 20 are inserted into the slots 26, 28, the blade 30 is supported against the shoulders 22, 24 on each prong.

As shown in FIGS. 1 and 2, the prongs are drawn together and flex the razor blade 30 into a concavo-convex shape with the convex surface 32 facing outwardly away from the prongs and the cutting edges 34, 35 of the blade disposed perpendicular to the plane of the prongs. The blade is held flexed in this orientation by a tie member 36 connected between the two prongs at a location intermediate their lengths which tie member resists the outward bias force exerted by the resiliency of the flexed razor blade.

In the embodiment shown, the tie member includes a pair of wire like members 38, 40 each enlarged on one end 42, 44 disposed through holes 46, 48 in each prong and releasably connected together by way of interlocking hooks 50, 52 provided on the opposite ends of each member. As noted, the members 38, 40 are sized to hold the blade in a desired accurate configuration.

Other forms of the tie member are of course possible including an adjustable length member so that the curvature of the blade can be adjusted if desired.

In use, it has been found that thorns can be removed from a cactus without mutilating the cactus by placing one of the cutting edges 34, 35 of the blade on the surface of the cactus adjacent to the base of the thorn to be removed and imparting a generally circular motion to the blade by rotating the handle circularly up away from the surface of the cactus. This circular motion coupled with the concavo-convex shaped cutting edge causes the blade to cut into the flesh of the cactus beneath the thorn removing the thorn and leaving only minimal scarring of the cactus in the form of a small semi-circular depression or dimple at the site of the thorn.

The tool described is simply constructed and effective in removing cactus thorns and those having the benefit of this description can readily devise other embodiments and modifications which are to be considered to be within the scope of the appended claims.

What is claimed is:

1. A cutter for removing thorns from a cactus comprising:
   a pair of diverging prongs pivotably connected together at one end, an opposite end of each prong including tab means sized to be received in transverse slots in a wafer type razor blade having a cutting edge; and
   means connected between said prongs for drawing said prongs together to flex and retain said razor blade in a concavo-convex shape with a convex surface of said razor blade facing outwardly from said prongs and said cutting edge of said razor blade directed perpendicular to a plane of said prongs.

2. A cutter for removing thorns from a cactus comprising:
   a fork shaped member including a pair of elongated prongs pivotably connected together at one end, a free end of each prong including a rectangular tab sized for receipt in one of a pair of transverse slots provided in a wafer type razor blade; and means for retaining said prongs in a predetermined spacing with said razor blade in a flexed concavo-convex orientation with said tabs received in said transverse slots in said razor blade and a convex surface of said razor blade disposed facing outwardly from said prongs.

3. A cutter for removing thorns from a cactus comprising:

a fork shaped member including a pair of prongs pivotably connected together at one end, opposite ends of each prong adapted to removably attach to a wafer type razor blade of the type having two transverse spaced apart slots by fitting through said slots, a cutting edge of the razor blade orientated perpendicular to a plane of the two prongs; and means for maintaining said razor blade in a flexed concavo-convex configuration with a convex surface facing outwardly from said opposite ends.

* * * * *